Patented Apr. 6, 1954

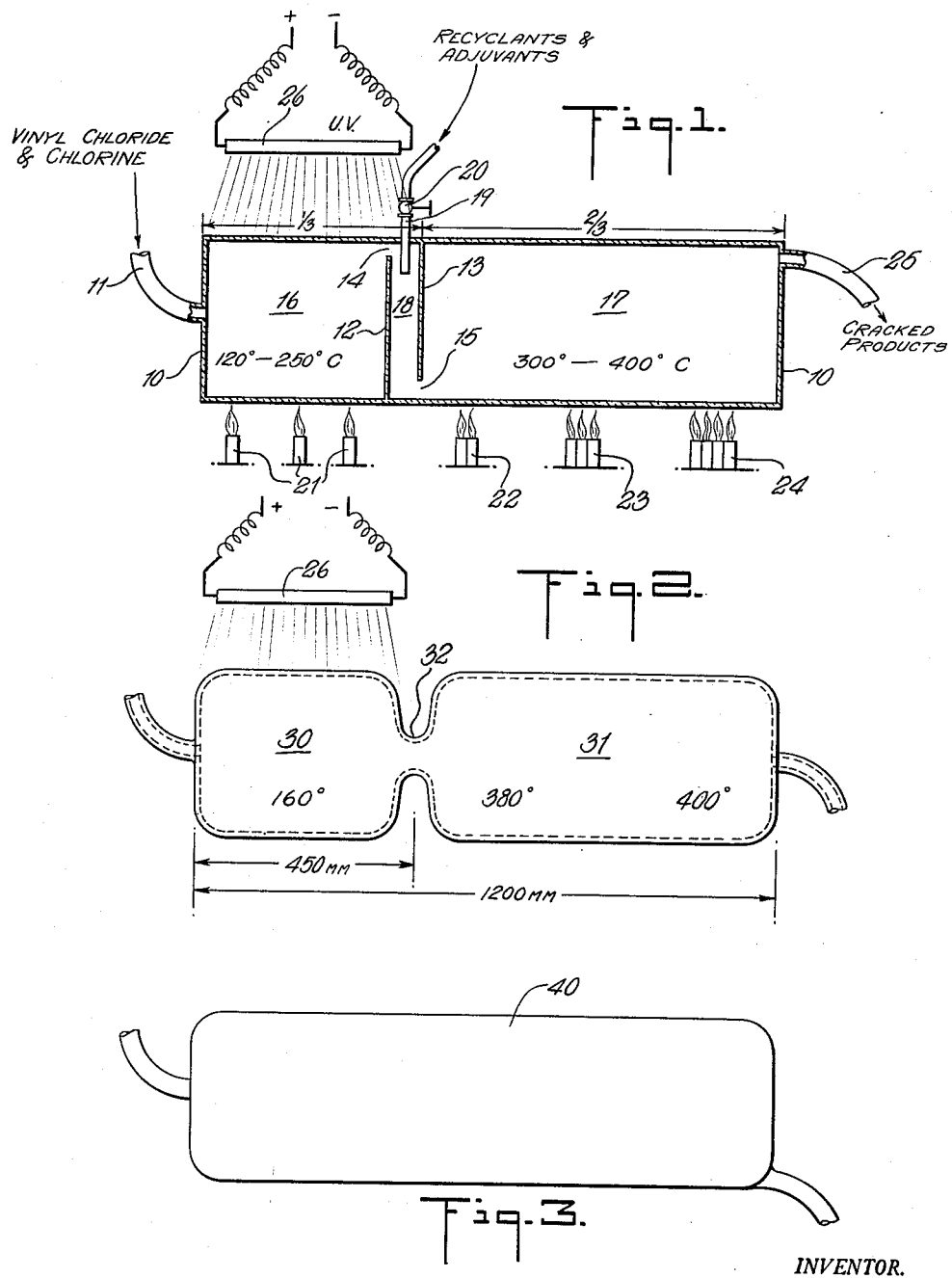

2,674,573

UNITED STATES PATENT OFFICE 2,674,573

PROCESS FOR THE PREPARATION OF SUBSTITUTED ALKANES

Marc Jean Lazare Crauland, Paris, France, assignor to Societe Anonyme des Manufactures des Glaces et Produits Chimiques de Saint-Gobain, Chauny & Cirey, Paris, France Application March 29, 1949, Serial No. 84,018

10 Claims. (Cl. 204—163)

This invention relates to the making of vinylidine chloride, $CH_2=CCl_2$, a compound that is very useful in the plastics industry. Several methods of making vinylidine chloride are known and are briefly summarized in "Resins Vinyliques," by Henri Gibello, Dunod, Paris, page 12, 1947.

This invention is particularly concerned with the preparation of vinylidine chloride by the cracking of trichloroethane and constitutes an improvement over known procedures, including that of this inventor which was described in U. S. application Serial No. 44,643, now abandoned.

This invention is applicable, in its extension, to all processes involving the pyrolytic cracking of halogenated hydrocarbons in gas phase. The preparation of vinylidine chloride constitutes a preferred part of the invention and the examples will be directed thereto in order to present valuable modifications of the invention and to display their effects, but it is to be understood that this particular description is for purposes of illustration and does not constitute a restriction of the principles of the invention within its natural scope.

It is an object of the invention to improve the process of making vinylidine chloride by the pyrolytic decomposition of chlorine-substituted hydrocarbons.

Another object of the invention is to reduce the side reactions which tend to occur in such processes.

Another object of the invention is to present a novel apparatus particularly adapted to the carrying out of this process. A particular object of the invention is to increase the yield of the principal product and to increase the efficiency of the invention by which it is produced, in comparison to the known prior art.

The objects of the invention as to process are carried out by making nascent trichloroethane and cracking the nascent trichloroethane without permitting it to change phase. According to an extension of the invention, the process includes preparing compounds by cracking halogen-substituted hydrocarbons pyrolytically in the nascent state. It is also part of the invention to improve the yield and the direction of the reaction by cracking the halogenated hydrocarbons in nascent state in the presence of an undesired product of such cracking.

The objects of the invention as to product, are attained by apparatus constructed in accordance with the principles set forth in the accompanying drawings, of which Figure 1 is a vertical sectional view through a reaction tube of the novel type useful for the carrying out of the invention.

Figure 2 is a modified form of apparatus viewed in elevation.

Figure 3 is a further modification of the reaction tube.

Among the methods of preparing vinylidine chloride, that process which depends upon the cracking of trichloroethane occupies an important position. This cracking is generally carried out at temperatures on the order of 300 to 500° C. in the presence of catalyst, or in the presence of bodies such as chlorine, oxygen, or air, and produces a mixture of substances among which vinylidine chloride $CH_2=CCl_2$, and symmetrical dichloroethylene $CHCl=CHCl$ are principal constituents. In that process an important quantity of trichloroethane escapes cracking and symmetrical dichloroethylene is produced in larger quantities than vinylidine chloride, so that the yield from the transformation of trichloroethane to vinylidine chloride is very small.

It has been proposed to carry out the cracking above 500° C. and it has been shown that the proportion of vinylidine chloride with respect to dichloroethylene in the reaction product increases at such elevated temperatures, but there is a tendency to introduce a carbonization to the detriment of the formation of the light products (vinylidine chloride and symmetrical dichloroethylene) so that, everything taken into account, the yield of vinylidine chloride is not increased.

The process of the present invention overcomes the difficulties of the prior processes and achieves a better yield of vinylidine chloride. In carrying out this process, nascent trichloroethane is activated by ultraviolet light and pyrolytically cracked while still in the nascent state.

I have discovered that nascent trichloroethane activated by ultraviolet light possesses the property of cracking at relatively low temperature even in the absence of catalyst, and that under these conditions the cracking provides a better yield of vinylidine chloride than did the prior processes. Furthermore, the invention has the advantage, apart from the improvement of the yield of vinylidine chloride, of not requiring any catalyst, an advantage which reduces the danger of combustion or spontaneous decomposition of the reaction mass, which was present and constituted an objection to prior processes.

The operations are easy to conduct because the cracking takes place at moderate temperature, which permits the temperature of cracking to be selected and regulated with some accuracy.

I have demonstrated that the superior properties possessed by the nascent irridated trichloroethane are fugitive and in particular, disappear completely if the trichloroethane is condensed before being subjected to cracking. Consequently, the embodiment of the invention implies that the trichloroethane is to be submitted to cracking immediately after its formation.

The apparatus shown in the drawings is conceived for the preparation of nascent trichloroethane from vinyl chloride and chlorine, and for its immediate cracking, but it is to be understood that the invention includes the cracking of nascent trichloroethane regardless of the method used in its preparation. The invention also includes the concept of cracking other nascent halogenated hydrocarbons regardless of the method of preparing them.

Referring to the numerals in the drawings, 10 indicates a tube, which may be of glass, or other heat resistant inert material, which has a port 11 for the reception of vinyl chloride and chlorine and barriers 12, 13, one of which has a port 14 and the other a port 15 through which the gases from the chamber 16 can pass to the chamber 17. The small space 18 between the baffles 12 and 13 is penetrated by a nozzle 19 which is controlled by valve 20 and serves for the admission, if desired, of those products of cracking which are to be recycled, or for the admission of adjuvants, the nature of which will be more fully pointed out herein. The first chamber is provided for the reaction of vinyl chloride and chlorine at a suitable temperature, and may conveniently occupy possible one-third (⅓) the length of the tube. The chamber 17 occupies approximately two-thirds (⅔) of the length of the tube, and is heated to the temperature at which the products formed in chamber 16 are cracked. 21 are diagrammatic showings of heating means, different intensities of heat for different portions of the tube are indicated at 22, 23, and 24 by the multiplication of the diagrammatic heating means. The discharge end of the tube 10 is provided with an outlet 25 through which the cracked products lead to separating means of the type heretofore employed in the separation of vinylidine chloride from mixed gases. Over the chamber 16 is an ultraviolet ray tube 26 by means of which the reaction mixture in the chamber is irradiated.

In Figure 2 is shown a modified form of reaction tube in which a chamber 30 serves for the irradiated reaction of vinyl chloride and chlorine and chamber 31, which is more or less separated from chamber 30 by a restriction 32, for the cracking of the products formed in chamber 30.

In Figure 3 the reaction is carried out by a simple tube 40 upon nascent trichloroethane prepared by any satisfactory process.

In a tube of sufficient length the use of barriers is not essential but they provide a convenient means of maintaining controlled temperatures and are preferred in the apparatus. The mixture of raw materials, chlorine and vinyl chloride in gas phase, is introduced at the head of the first zone. The addition reaction proceeds easily, and even at ordinary temperatures in the presence of ultraviolet radiation, it proceeds with a satisfactory yield between 120–250° C., and at an optimum between 160–190° C.; the reaction proceeds above 250° C., but at such temperatures there is grave risk of combustion, with the depositing of carbon, the loss of raw materials, and the reduction of yield.

I have demonstrated that the properties which are conferred on trichloroethane by its nascent state and irradiation by ultraviolet light persists for a sufficient time to allow the cracking to be carried out at a relatively low temperature in the second zone of the tube, provided the nascent trichloroethane remains in the vapor phase. In practice, it is possible to carry out the cracking at a temperature on the order of 300–400° C., a temperature at which the decomposition of trichloroethane proceeds with the least production of heavy products.

A satisfactory and recommended procedure includes maintaining the second zone of the tube at temperatures of 350–380° C. at the upstream end of the zone, increasing to 400° C. at the discharge end.

In feeding the first zone of the tube with a gaseous mixture containing chlorine and vinyl chloride in which the molecular ratio represented by the formula $$R = \frac{CH_2=CHCl}{Cl_2} = 1$$

is maintained, there is discharged from the other end of the tube a mixture, in almost equal parts, composed principally of vinylidine chloride and symmetrical dichloroethylene, with a little trichloroethylene. There is also some uncracked trichloroethane, some percentage of heavy products of synthesis, and some unreacted vinyl chloride. The losses do not ordinarily exceed 2–5%.

The employment of a small excess of vinyl chloride in the mixture of raw materials, for instance, a ratio of $R=1.3$ to $1.5$ in the above formula, partially prevents the formation of trichloroethylene and the heavy products and increases the yield of vinylidine chloride and symmetrical dichloroethylene. Above the ratio $R=1.5$ further improvement is not observed.

The process, it will be observed, has, as its principal products, a mixture of vinylidene chloride and symmetrical dichloroethylene.

When it is desired to produce the vinylidine chloride mainly or exclusively, symmetrical dichloroethylene is added to the gases passing to the cracking zone, which inhibits the formation of symmetrical dichloroethylene and increases the amount of vinylidine chloride that is produced. The symmetrical dichloroethylene added may be in liquid but is preferably in vapor phase, and may be in an amount about 1.5 mol per mol of chlorine introduced into the first zone. In carrying out this modification practically, it is advantageous to recycle dichloroethylene produced by the reaction itself. This is indicated in Fig. 1 by the tube 19 which may be connected to the separating apparatus by means of which the vinylidine chloride is separated from the symmetrical dichloroethylene. Under these conditions the quantity of vinylidine chloride formed is materially increased. 20–30% of uncracked trichloroethane is discharged from the cracking tube under normal conditions. It has been observed that it is possible to achieve a total cracking of the trichloroethane by raising the temperature, but this causes material losses of a different kind.

It is much more advantageous to recycle the unreacted trichloroethane which is thus introduced at the same time as the symmetrical dichloroethylene which is also recycled. It has been demonstrated that under these conditions of double recycling, that is of recycling both symmetrical dichloroethylene and trichloroethane, a material increase in the yield of vinylidine chloride is secured.

There are given hereinafter several examples illustrating the cracking between 380-400° C., without catalyst, of nascent trichloroethane that has been activated by ultraviolet light during the action of chlorine on vinyl chloride. At the same time, it should be understood that one does not part from the scope of the invention in cracking nascent, irradiated trichloroethane in the presence of a catalyst, which permits operation at a temperature even lower or with better yield at equal temperature. The catalysts employed in this phase of the invention are of the same type that have heretofore been used in the production of vinylidene chloride by the cracking of trichloroethane.

*Example 1.*—A tube of glass 1200 mm. long and 35 mm. in diameter was irradiated by ultraviolet light through the first 450 mm. of its length and there was introduced through the entrance of this tube two moles of chlorine and two moles of vinyl chloride per hour. The irradiated part of the tube was kept at 160° C. The second part of the tube, in which is the cracking zone, was heated at 380° C. at the beginning of the zone and 400° C. at the discharge. After two hours operation, during which time products issuing from the tube were condensed and separated by the usual means, the yield was calculated with respect to the chlorine introduced at the entrance of the apparatus and the following results were obtained:

| | Moles per 100 moles of chlorine |
|---|---|
| Vinylidine chloride | 32.2 |
| Symmetrical dichloroethylene | 30.0 |
| Trichloroethylene | 7.1 |
| Trichloroethane | 8.5 |
| Heavy products (probably tetrachlorethane) | 5.2 |
| Vinyl chloride recovered | 15.2 |

*Example 2.*—The operation was carried out as in Example 1, but with a small excess of vinyl chloride. 2.67 moles of vinyl chloride and two moles of chlorine were introduced per hour. After two hours of operation the following yield was obtained, based on the chlorine.

| | Moles per 100 moles of chlorine |
|---|---|
| Vinylidine chloride | 35.7 |
| Symmetrical dichloroethylene | 37.3 |
| Trichloroethylene | 7.6 |
| Trichloroethane | 11.5 |
| Heavy products | 4.0 |

*Example 3.*—Operating as in Example 1, but introducing 2.59 moles of vinyl chloride and 1.875 moles of chlorine. Furthermore, between the zone irradiated by the ultraviolet light and the cracking zone there was introduced in vapor phase 3.04 moles of symmetrical dichloroethylene per hour. Subtracting the symmetrical dichloroethylene, the yield was as follows:

| | Moles per 100 moles of chlorine |
|---|---|
| Vinylidine chloride | 51.9 |
| Symmetrical dichloroethylene | 0.4 |
| Trichloroethylene | 4.3 |
| Trichloroethane | 20.0 |
| Heavy products | 8.0 |

*Example 4.*—The operation was carried out as in Example 1, introducing 2.15 moles of vinyl chloride and 1.46 moles chlorine per hour. Between the irradiated tube and the cracking tube there was introduced 2.98 moles of symmetrical dichloroethylene and .5 mole of trichloroethane, mixed and in vapor phase. After two hours of operation, there was obtained, deducting the dichloroethylene and trichloroethane introduced, the following results:

| | Moles per 100 moles of chlorine |
|---|---|
| Vinylidine chloride | 65.5 |
| Symmetrical dichloroethylene | 0.0 |
| Trichloroethylene | 5.2 |
| Trichloroethane | 16.1 |
| Heavy products | 7.7 |

This invention accomplishes the manufacture of vinylidine chloride by cracking trichloroethane, which has been irradiated during the formative reaction. In one form of the invention the nascent, activated trichloroethane is prepared by submitting a mixture of vinyl chloride and chlorine in a mol ratio between 1 and 1.5 to ultraviolet radiations at a temperature between 120 and 250° C. and preferably between 160 and 180° C. In a preferred reduction of this procedure the cracking of nascent, activated trichloroethane, is carried out in the absence of a catalyst at a temperature between 300-500° C. and preferably 350° and 400° C. In a variant of the invention the cracking temperature is gradually raised between the entrance to and the discharge end of the cracking zone. It is advantageous to introduce symmetrical dichloroethylene immediately before the cracking and that which is produced in the course of cracking is most suitable for this purpose. Preferably, the uncracked trichloroethane issuing from the cracking zone is recycled with the recycled dichloroethylene.

In a preferred form of the invention, the synthesis of trichloroethane and its cracking are accomplished in a single apparatus of which one zone is carried to a temperature suitable for the formation of trichloroethane and another is raised to that which is suitable for cracking.

This invention is applicable to the preparation and cracking of tribromoethane, trifluoroethane and triiodoethane. It is also applicable to the preparation and cracking of other halogenated hydrocarbons such as to the members of the propane and butane series, starting with a reaction between a halogen and a hydrocarbon having a double bond to form the alkane and cracking the alkane in the nascent state. The invention is also applicable to the cracking of nascent hydrocarbons, halogenated hydrocarbons, and hydrocarbons substituted by elements other than halogens; when it has been possible to crack such hydrocarbons heretofore they can be cracked by this process with improved results. This process is applicable to the cracking of all hydrocarbons which can be pyrolytically cracked without regard to the number and kind of substituents.

I am well aware that this reaction is new, and that it may not proceed by the path theoretically assigned to it herein, but I am not to be bound by the theory stated here, or by other later theories since it is the fact that the reaction proceeds to the desired end, regardless of the path by which it travels.

As many apparently widely different embodiments of the present invention may be made without departing from the spirit and scope thereon, it is to be understood that the invention is not limited to the specific embodiment.

What is claimed is:

1. The method of making vinylidine chloride that includes the steps of passing a stream of vinyl chloride and chlorine at a rate of two mols of each per hour through a space of 450 mm. length and 35 mm. width irradiated by ultra violet light at a temperature of 160° C., and immediately passing the stream without change of phase from said zone through a second zone of like width and 750 mm. length that increases in temperature from 380° C. at the entrance to 400° C. at the discharge, and recovering the vinylidine chloride from the effluent.

2. The method of making vinylidine chloride that includes the steps of passing a stream of mixed vinyl chloride and chlorine in a molecular ratio of at least 1.3 to 1 respectively in gas phase through a zone heated to a temperature favorable to the formation of trichloroethane, irradiating said gases in said zone by ultraviolet light, passing the reaction product of said zone, immediately without change of phase, into another zone heated to about 300–400° C., and recovering the vinylidine chloride from the effluent from said other zone.

3. The method of making vinylidine chloride that includes the steps of passing a stream of vinyl chloride and chlorine at a rate of 2.67 moles of vinyl chloride to 2 moles of chlorine per hour through a space of 450 mm. length and 35 mm. width irradiated by ultraviolet light at a temperature of 160° C., and immediately passing the stream from said zone through a second zone of like width and 750 mm. length that increases in temperature from 380° C. at the entrance to 400° C. at the discharge.

4. The method of making vinylidine chloride that includes the steps of passing a stream of mixed vinyl chloride and chlorine, in a molecular ratio of at least 1 of vinyl chloride to 1 of chlorine, through a zone irradiated by ultraviolet light and heated to a temperature favorable to the formation of trichloroethane, passing the reaction product of said zone, immediately and without change of phase, into a zone heated to about 300–400° C. and removing the vinylidine chloride from the effluent from said last named zone.

5. The method of making vinylidine chloride that includes the steps of making trichloroethane in gas phase from vinyl chloride and chlorine with ultraviolet light, the vinyl chloride being present in a molecular ratio of at least about 1.3 to 1 of chlorine, immediately, without change of phase, while still in the nascent state, pyrolytically cracking the trichloroethane by heating it to a temperature range having a minimum at about 300° C., and recovering the vinylidine chloride from the products of said cracking.

6. The method of making vinylidine chloride that includes the steps of passing 2.59 mols of vinyl chloride and 1.875 mols of chlorine per hour through a zone heated to 160° C. and irradiated with ultraviolet light, admixing with the irradiated product 3.04 mols per hour of symmetrical dichloroethylene, and passing the mixture through a zone having a temperature of 380° C. at the entrance and 400° C. at the discharge.

7. The method of making vinylidine chloride that includes the steps of passing vinyl chloride and chlorine in a molar ratio of at least about 1.3 to 1 respectively through a zone kept at a temperature favorable to the production of trichloroethane and irradiated by ultraviolet light, immediately adding symmetrical dichloroethane to the reaction product and immediately heating the mixture, without phase change of the trichloroethane, to a temperature range beginning about 300° C., and recovering vinylidine chloride from the product of the last said heating.

8. The method of making vinylidine chloride that includes the steps of passing a gaseous mixture containing quantities of chlorine and vinyl chloride in a molar ratio of the former to the latter of at least 1:1 through ultraviolet irradiation at a temperature favorable to their reaction to form trichloroethane, and immediately, pyrolytically cracking the trichloroethylene at about 300–400° C., before phase change occurs, in the presence of an added quantity of an undesirable hydrocarbon product of cracking, and recovering the vinylidine chloride from the product.

9. The method of making vinylidine chloride that includes the steps of passing 2.15 mols vinyl chloride and 1.46 mols chlorine per hour through ultraviolet light at about 160° C., adding to the product 2.98 mols per hour of symmetrical dichloroethylene and 15 mols per hour of trichloroethane in gas phase, immediately subjecting the mixture without phase change to a temperature favorable to the cracking of nascent trichloroethane removing vinylidine chloride, and returning uncracked gases to the cracking zone with freshly made gases.

10. The method of making vinylidine chloride that comprises making trichloroethane in gas phase from chlorine and vinyl chloride by reacting them at a temperature between about 120° C. and 250° C. while irradiating with ultraviolet light, and immediately and before it changes phase, heating it to a temperature circa 300–400° C., and recovering the vinylidine chloride from the products formed at the latter temperature range.

References Cited in the file of this patent

UNITED STATES PATENTS

| Number | Name | Date |
|---|---|---|
| 1,833,393 | Ernst et al. | Nov. 24, 1931 |
| 1,921,879 | Hermann et al. | Aug. 8, 1933 |
| 2,174,737 | Coleman et al. | Oct. 3, 1939 |
| 2,322,258 | Strosacker et al. | June 22, 1943 |
| 2,378,859 | Mugdan et al. | June 19, 1945 |
| 2,379,372 | Mugdan et al. | June 26, 1945 |
| 2,461,142 | Cass | Feb. 8, 1949 |

FOREIGN PATENTS

| Number | Country | Date |
|---|---|---|
| 349,872 | Great Britain | June 4, 1931 |
| 534,733 | Great Britain | Mar. 17, 1941 |